Nov. 22, 1927.
N. P. BACH
1,650,416
METHOD OF SEALING CANS
Filed March 3, 1923
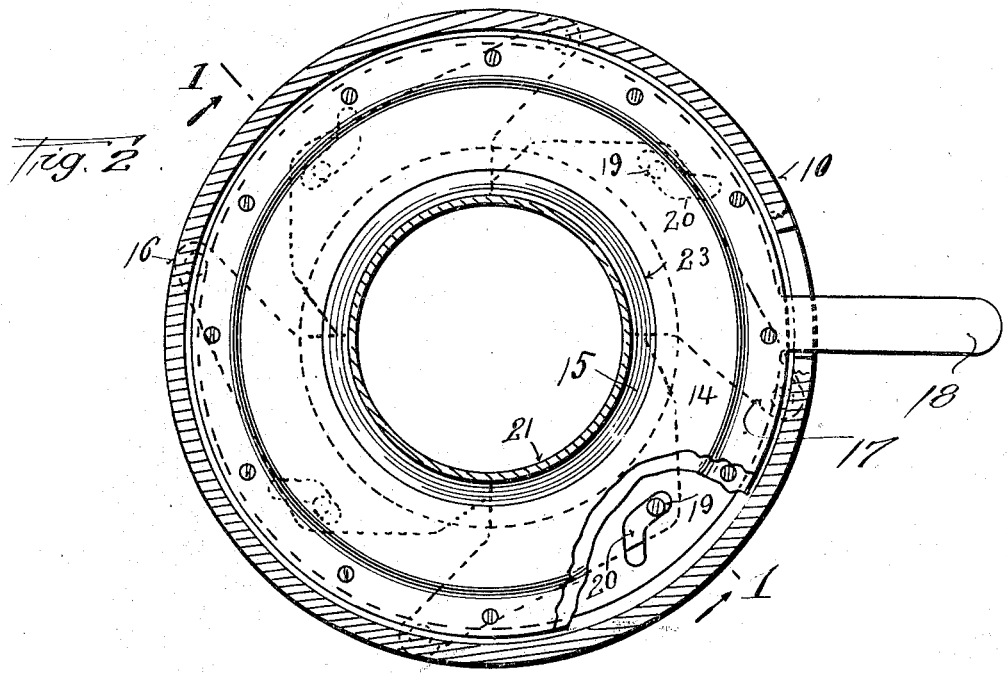
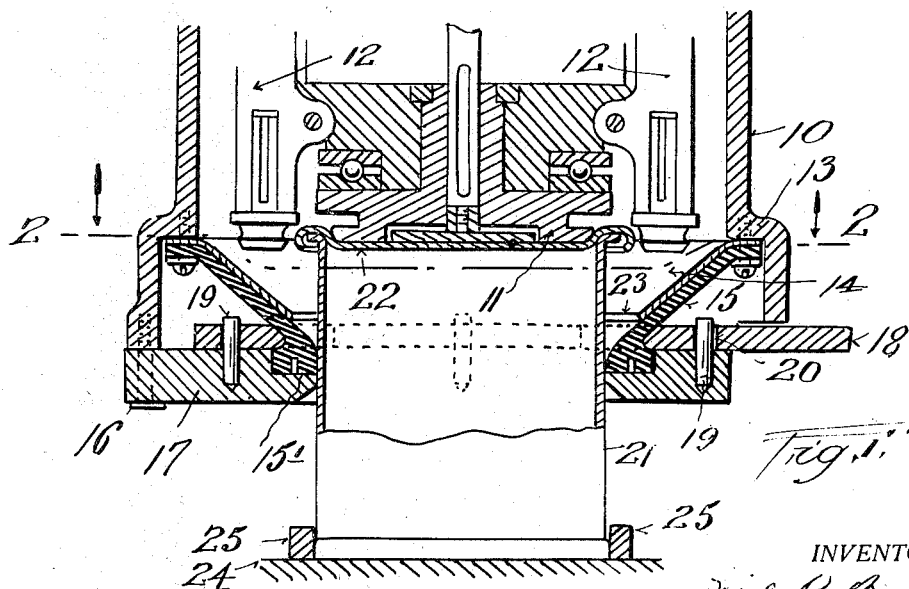
INVENTOR
Niels P. Bach
BY Darby & Darby
ATTORNEYS Patented Nov. 22, 1927.

1,650,416

UNITED STATES PATENT OFFICE.

NIELS P. BACH, OF MILLBURN, NEW JERSEY, ASSIGNOR TO THERMOKEPT CORPORATION, OF NEW YORK, N. Y., A CORPORATION OF DELAWARE.

METHOD OF SEALING CANS.

Application filed March 3, 1923. Serial No. 622,704.

In the art of sealing containers in vacuo, it has heretofore been the practice to enclose individual containers, either separately or in groups, under a bell jar or vacuum chamber in which a suitable vacuum is then established while the container, or group of containers, is sealed. The vacuum is then broken and the sealed container or group of containers, is removed to be replaced by others, and the mode of procedure is repeated. As an alternative, or improvement, over the above mode of procedure, a continuous stream of containers is fed through a special valve into a vacuum chamber, wherein a constant vacuum is maintained and wherein the containers are sealed and passed out through a similar valve without breaking the vacuum. In the operations noted above is the container completely submerged into vacuo, that is, enclosed in the vacuum chamber and subject to vacuumization, during the sealing operation, and while the container or can is being sealed. It is found necessary, however, in order to carry out the above named processes, that expensive and extensive machinery be maintained.

I have discovered that containers may be effectively and quickly sealed when the open ends thereof only are immersed, or enclosed in a vacuum chamber. My method of thus sealing containers affords facilities for vacuumizing the contents of the container before the same is sealed and at the same time greatly reduces the area to be vacuumized, thus shortening the time required to establish the desired degree of vacuumization and thereby greatly relieving the pump of excessive work and the longer periods of pumping.

The object of my invention therefore embraces the method of submerging the open end of a container in a vacuum and thus sealing the same while the container itself is not surrounded by a vacuum or enclosed in a vacuum chamber. This novel method may be effected in any desired manner, whereby the open end of a can to be sealed is subjected to vacuumization just before and while being sealed. Any means whereby the unsealed end of a can or container, which is to be sealed under vacuo, is enclosed or engulfed in a vacuum and thus sealed, will answer my purpose. As a practical illustration, however, I have shown in the accompanying drawing, one form of means for effecting the mode of my operations.

In this drawing,

Fig. 1 is a vertical section on lines 1—1 of Fig. 2, and

Fig. 2 is a cross section on lines 2—2 of Fig. 1, looking in the direction of the arrows.

In the illustrative form disclosed by the drawing, a standard bell jar containing the usual chuck 11 and sealing members 12 is shown as being provided with an offset or shoulder 13 onto which is fastened a metal shield 14 and rubber gasket 15. The head $15^1$ of this gasket is preferably larger than the container and its unsealed cap so as to receive the same when the container is placed in position for sealing. At spaced intervals on the end of the bell jar and pivotally fastened, by any suitable means as screws 16, a number of cam jaws or members 17, which are operated by a lever 18, with pins 19, sliding in slots 20, to contract the head end of the rubber gasket about the body of a container 21 when the bell jar with its sealing devices is lowered over the container for the purpose of establishing a vacuum about the open end of the can or container. The container is provided with a cover 22, which is sealed after the cam jaws are closed and a vacuum has been established about the open can end or head. It will be noted that the shape of the gasket is frusto-conical, with its cone tapering outwardly against the difference of atmospheric pressures, which is established about the two ends of the container or within and without the bell jar. The greater therefore the degree of vacuum about the head of the can, the greater will be the grip of head $15^1$ about the container.

The shield 14 is provided with a mouth or opening 23 which as in the case of the gasket head, is of sufficient size to permit the container and cover to pass in and out freely, as the bell jar, with its sealing members, is lowered or raised, whereby said containers are sealed in the manner and for the purpose specified. With the particular construction herein described and shown, containers filled with goods, which may have been previously vacuumized or not, but which are to be sealed in vacuo, are positioned on a table 23, having guides 25 to properly locate the container. Preferably, though not necessarily, the cover is loosely held on the container and ready for sealing when the container is moved into position. Obviously the containers may be moved into and out of position in any desired manner as by hand or by a suitable conveyor, and since these features form no part of my present invention, I have not shown said constructions, but I have shown a container in position and ready to be sealed, the moment that the proper degree of vacuumization has been established, which is done by a suitable vacuum pump (not shown) and which pump is connected to the bell jar in the manner well understood in the art. It is further obvious that my method of sealing, or vacuumizing and sealing as the case may be, can be carried out by other instrumentalities than the illustrative form herein disclosed, and that the containers may be of glass or other material as well as metal.

What I claim, therefore, as new and useful, of my own invention, and desire to secure by Letters Patent, is:—

The method of vacuumizing and sealing containers under vacuo, which comprises inserting the unsealed end of a container into the apex of a frusto-conical gasket, and thus sealing said container against the outer atmosphere and establishing a vacuum in said container while the greater portion of said container is exposed to normal atmospheric pressure, and then causing the container to be vacuum sealed.

In testimony whereof I have hereunto set my hand on this 1st day of March, A. D. 1923.

NIELS P. BACH.